United States Patent [19]
Foladare et al.

[11] Patent Number: 5,905,777
[45] Date of Patent: May 18, 1999

[54] E-MAIL PAGING SYSTEM

[75] Inventors: Mark Jeffrey Foladare, Kendall Park; Shelley B. Goldman, East Brunswick; David Phillip Silverman, Somerville; Roy Philip Weber, Bridgewater; Robert S. Westrich, Middletown, all of N.J.

[73] Assignee: AT&T Corp., Middletown, N.J.

[21] Appl. No.: 08/720,128

[22] Filed: Sep. 27, 1996

[51] Int. Cl.⁶ .................................................. H04M 11/00
[52] U.S. Cl. ................................. 379/90.01; 379/93.24; 379/102.02; 455/414; 340/825.44
[58] Field of Search .............................. 379/90.01, 93.01, 379/93.05, 93.06, 93.07, 93.14, 93.17, 93.23, 93.24, 100.08, 100.09, 102.01–102.03, 88, 89, 201, 210–212; 455/31.2, 31.3, 414, 415, 417; 348/17; 340/825.44

[56] References Cited

U.S. PATENT DOCUMENTS

| | | | |
|---|---|---|---|
| 4,814,763 | 3/1989 | Nelson et al. | 455/31.3 |
| 4,942,598 | 7/1990 | Davis | 379/211 |
| 5,327,486 | 7/1994 | Wolff et al. | 379/211 |
| 5,457,732 | 10/1995 | Goldberg | 455/31.3 |
| 5,481,590 | 1/1996 | Grimes | 379/211 |
| 5,561,703 | 10/1996 | Arledge et al. | 455/31.2 |
| 5,613,108 | 3/1997 | Morikawa | 379/93.01 |
| 5,675,507 | 10/1997 | Bobo, II | 348/17 |
| 5,742,905 | 4/1998 | Pepe et al. | 379/210 |

OTHER PUBLICATIONS

Gareiss, R: "A Value–Added Service With Brains" Data Communications, vol. 24, No. 1, Jan. 1, 1995, pp. 66, 68, 70.

Miller J. G. et al. "Accessing Messages Your Way," AT&T Technology, vol. 10, No. 1, 21 Mar. 1995, pp. 6–9.

Palme J et al. "Issues When Designing Filters in Messaging Systems," Computer Communications, vol. 19, No. 2, Feb. 1996, pp. 95–101.

*Primary Examiner*—Stella Woo

[57] ABSTRACT

E-Mail messages transmitted over an E-Mail network are routed to an E-Mail server servicing the recipient, where useful E-Mail messages can be identified, separated from the junk mail, and forwarded as directed by the recipient. The E-Mail server sends a summary of the E-Mail message to the recipient over a different network so that the recipient can select a forwarding destination for the message. The recipient sends a selection signal to the E-mail server which then forwards the E-Mail message to the selected destination. The E-Mail message can be forwarded by the server over another network, such as the public telephone network, to a computer or a FAX machine at the recipient's office, home or other destination.

33 Claims, 11 Drawing Sheets

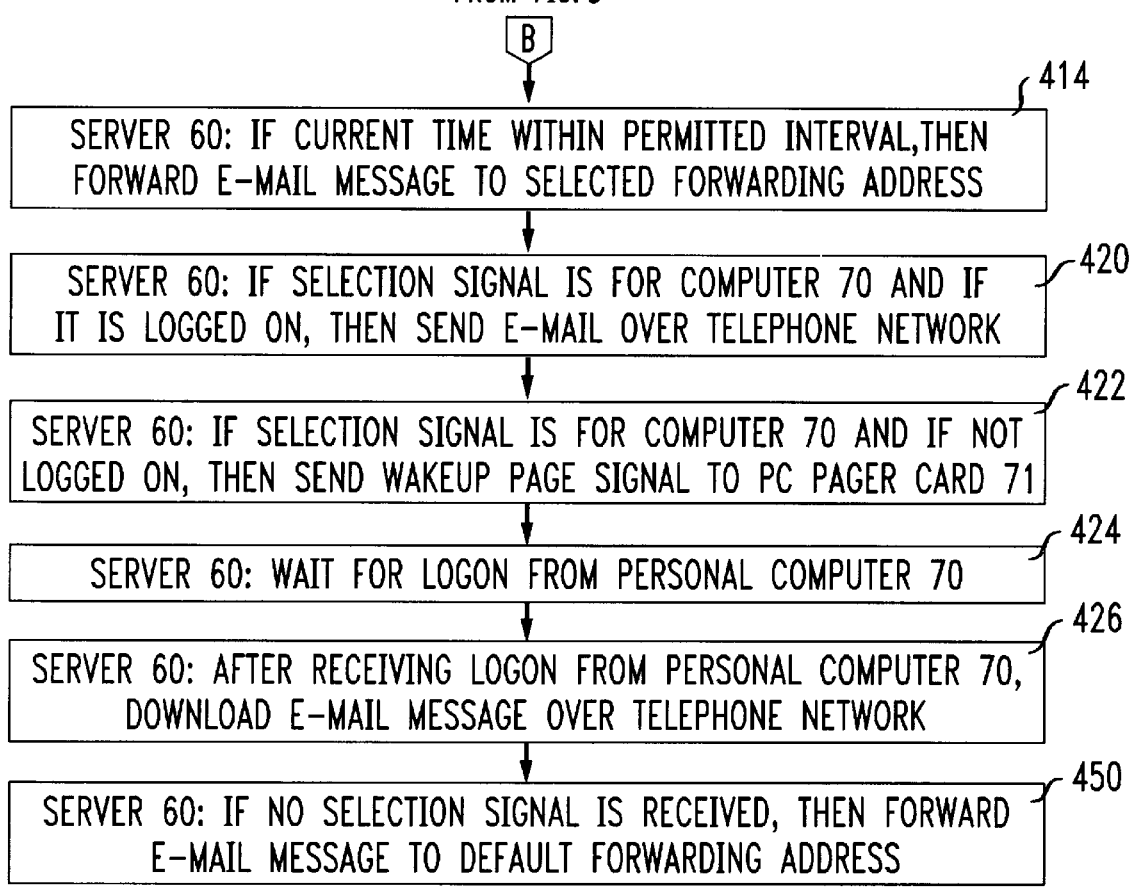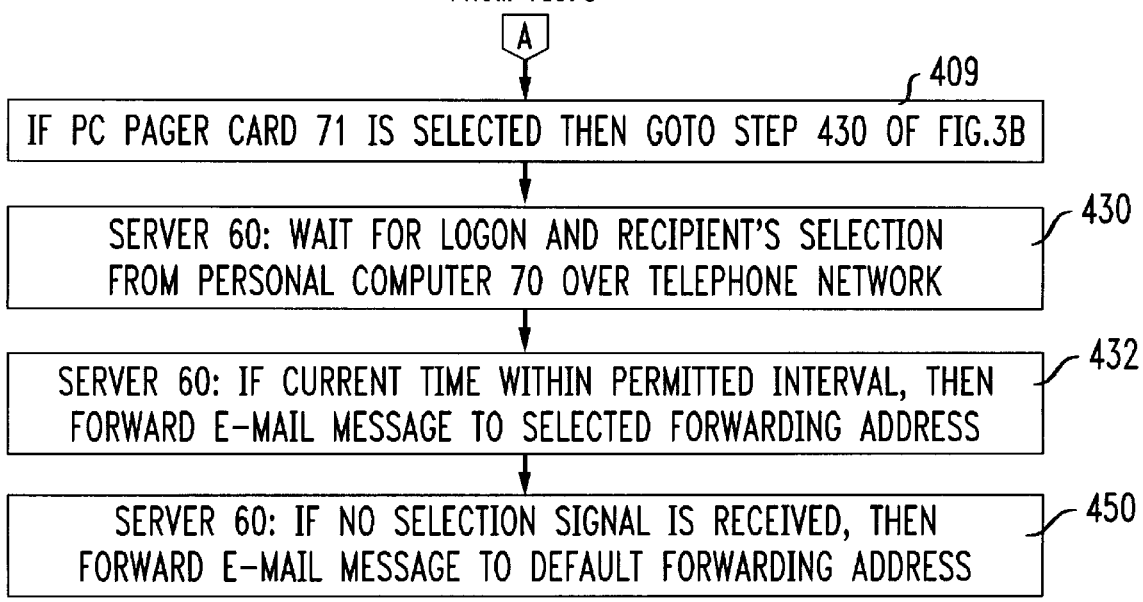

FIG. 4

DATABASE 62

RECIPIENT "A" — RECIPIENT RECORD 255

MOBILE PAGER 74 PAGING ADDRESS
PC PAGER CARD 71 PAGING ADDRESS
PC 70 TELEPHONE NUMBER

ALERT MODE
GENERAL DEFAULT

| SENDER | CHOICE 1 | CHOICE 2 | CHOICE 3 | TIME OK | DEFAULT |
|---|---|---|---|---|---|
| S. SMITH | PC 70 | FAX 72 | FAX 72' | 0700-2300 | PC 70 |
| J. JONES | PC 70 | FAX 72 | PC 70' | 0700-2300 | HOLD |

252  254  257  259

RECIPIENT "B" — RECIPIENT RECORD 255'

ANOTHER MOBILE PAGER PAGING ADDRESS
ANOTHER PC PAGER CARD PAGING ADDRESS
ANOTHER PC TELEPHONE NUMBER

ALERT MODE
GENERAL DEFAULT

| SENDER | CHOICE 1 | CHOICE 2 | CHOICE 3 | TIME OK | DEFAULT |
|---|---|---|---|---|---|
| A. ABLE | PC | ALT-PC | HOME FAX | 0700-2300 | HOME FAX |
| B. BAKER | DROP | ---- | ---- | NONE | ---- |

E-MAIL PAGING SYSTEM

CROSS-REFERENCE TO RELATED APPLICATIONS

This application is related to the co-pending patent application entitled "Intelligent Pager for Remotely Managing E-Mail Messages" by Foladare, et al. filed on the same day as this application, and incorporated herein by reference.

BACKGROUND OF THE INVENTION

1. Field of the Invention

The invention disclosed broadly relates to communications systems and more particularly relates to a method and system for alerting a recipient when E-Mail arrives.

2. Description of the Related Art

Electronic mail, commonly referred to as E-Mail, may be simple text messages containing only ASCII characters, or it may be complex messages containing embedded voice messages, spreadsheets, and images. E-Mail messages can be transmitted over a short-haul link such as a local area network or they can be transmit over intercontinental networks. The National Science Foundation's TCP/IP-based network (NSFNET) forms a backbone network that links supercomputing centers and over 2500 academic and scientific institutions around the world. Many private organizations have become communications service providers by connecting their subsidiary networks to the NSFNET. This composite network is popularly called the internet and it has become the primary medium for the transmission of E-Mail messages. Many members of the public have obtained subscriptions from internet service providers, have connected their personal computers to the service, and now exchange a large volume of E-Mail messages. The ease of sending E-Mail messages on the internet has created a significant amount of junk electronic mail that is indiscriminately downloaded into the recipient's personal computer. Valuable time is wasted by recipients who must winnow through unsolicited junk mail messages to find useful E-Mail relevant to their personal interests.

SUMMARY OF THE INVENTION

E-Mail messages transmitted over an E-Mail network are routed to an E-Mail server servicing the recipient, where useful E-Mail messages can be identified, separated from the junk mail, and forwarded as directed by the recipient. In accordance with the invention, the E-Mail server sends a summary of the E-Mail message to the recipient over a different network so that the recipient can select a forwarding destination for the message. The recipient sends a selection signal to the E-mail server which then forwards the E-Mail message to the selected destination. The E-Mail message can be forwarded by the server over another network, such as the public telephone network, to a computer or a FAX machine at the recipient's office, home or other destination.

The E-Mail server includes a database of recipient records for all of the E-Mail recipients it services. Each recipient establishes a list of senders whose messages are considered important to the recipient, the list being included in the recipient's record. The E-Mail server alerts the recipient to the arrival of such important messages to enable the recipient to designate to the server a selected forwarding destination to send the message. The alert signal includes enough information about the message, for example the name of the sender and the title or a summary of the message, to enable a forwarding selection to be made.

In accordance with the invention, the alert signal is transmitted from the server to the recipient over a different network than the E-Mail network. In one embodiment of the invention, the server transmits an alert signal over a wireless paging network to a mobile pager transceiver carried by the recipient. The wireless network may alternately be a personal communications system (PCS) wireless network that communicates the alert signal to a personal communications device carried by the recipient. The mobile pager or personal communications device has a display upon which the recipient can view the sender's name and the title of the message or a summary of the message. The recipient can use buttons or keys on the mobile pager or personal communications device to make a selection. The mobile pager or personal communications device then sends the selection signal over the wireless network to the server to forward the message to one of several destinations. If the forwarding address is to the recipient's computer, an additional step is taken by the server to wakeup the computer and have it log on to the E-Mail server. In response to the selection signal, the server sends a wakeup signal to the pager card attached to the recipient's computer. The wakeup signal sufficiently identifies the E-Mail message waiting on the server, to enable the computer to logon and request the message.

In another embodiment, the server transmits an alert signal over the wireless paging network to a pager card attached to the recipient's computer. The recipient can view the sender's name and the title of the message or a summary of the message which is displayed on the computer and can send a selection signal to the server to forward the message to one of several destinations. The selection signal can be sent from the recipient's computer over the public telephone network to the server. The server then forwards the E-Mail message to the selected destination in response to the selection signal. The E-Mail message can be forwarded over the public telephone network, or over the E-Mail network, or over another network such as the wireless paging network to the selected destination.

Another feature of the invention is the inclusion in the recipient's record in the server, of a plurality of alternate forwarding addresses previously specified by the recipient for each sender. The recipient can choose the desired forwarding address with the selection signal he sends to the server. The record at the server can also include a predefined time interval for sending the alarm signal to the pager. The record at the server can also include a default forwarding address in case the recipient does not respond with a selection signal within a general time-out interval. The customized values for the predefined time interval and the default forwarding address can be specified for each sender in the record.

In another embodiment of the invention, the server transmits the alert signal over a cable television network to a TV set-top box transceiver near the recipient. The television connected to the set-top box displays the sender's name and the title of the message or a summary of the E-Mail message. The recipient can use buttons or keys on the set-top box to make a selection. The set-top box then sends the selection signal over the cable television network to the server to forward the message to one of several destinations. If the forwarding address is to the recipient's computer, an additional step is taken by the server to wakeup the computer and have it log on to the E-Mail server. In response to the selection signal, the server sends a wakeup signal to a cable television adapter card attached to the recipient's computer. The wakeup signal sufficiently identifies the E-Mail message waiting on the server, to enable the computer to logon and request the message.

DESCRIPTION OF THE FIGURES

FIGS. 3, 3A, and 3B show flow diagrams of the E-Mail server control program 228.

FIG. 4 shows a first recipient record 255 for Recipient_A and a second recipient record 255' for Recipient_B.

DISCUSSION OF THE PREFERRED EMBODIMENT

Figure 1:
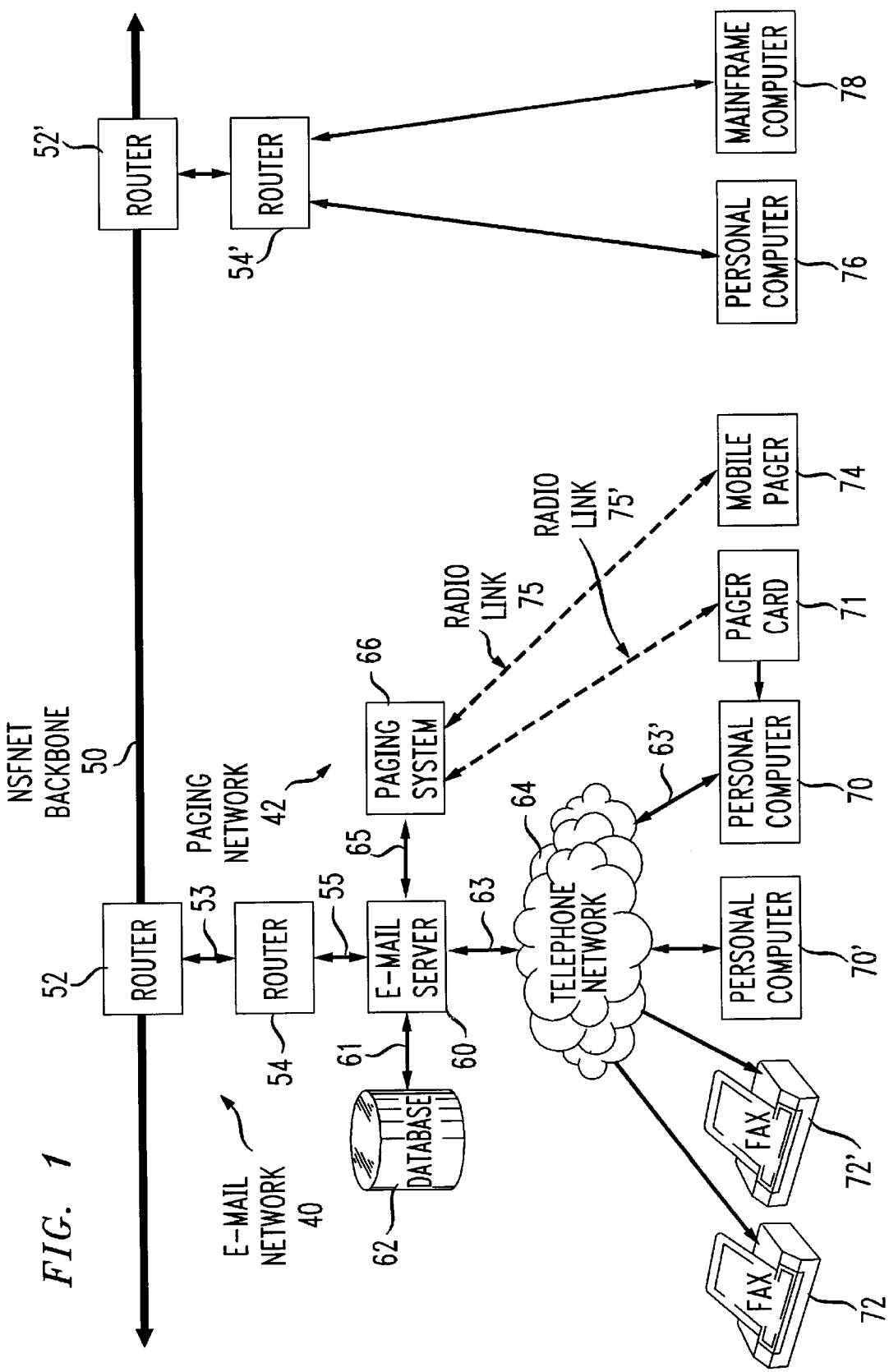
FIG. 1 shows the E-Mail network 40, the paging network 42, and the telephone network 64 connected to the E-Mail server 60.

FIG. 1 shows the E-Mail network 40, the paging network 42, and the telephone network 64 connected to the E-Mail server 60. An E-Mail message entitled "Meeting Notice" is prepared at the personal computer 76 or the mainframe computer 78 by a sender named "S. Smith" and is addressed to "Recipient_A". The message is sent to the E-Mail network 40 which includes the router 54', router 52', and the NSFNET backbone network 50. The E-Mail message has a network routing address, for example a domain-based address "RECIPIENT_A @ COMPANY_C.COM". The E-Mail network 40 appends to the E-Mail message a unique message ID such as the string "ssmith-76-0930-091296" consisting of the sender's ID, the sender's network node ID, the time of day, and the date. The E-Mail network 40 routes the E-Mail message over the backbone network 50, the router 52, and the router 54 over path 53 to the E-Mail server 60 over path 55. The E-Mail server 60 buffers the E-Mail message while it waits for the recipient to select a forwarding destination for the message.

Figure 2:
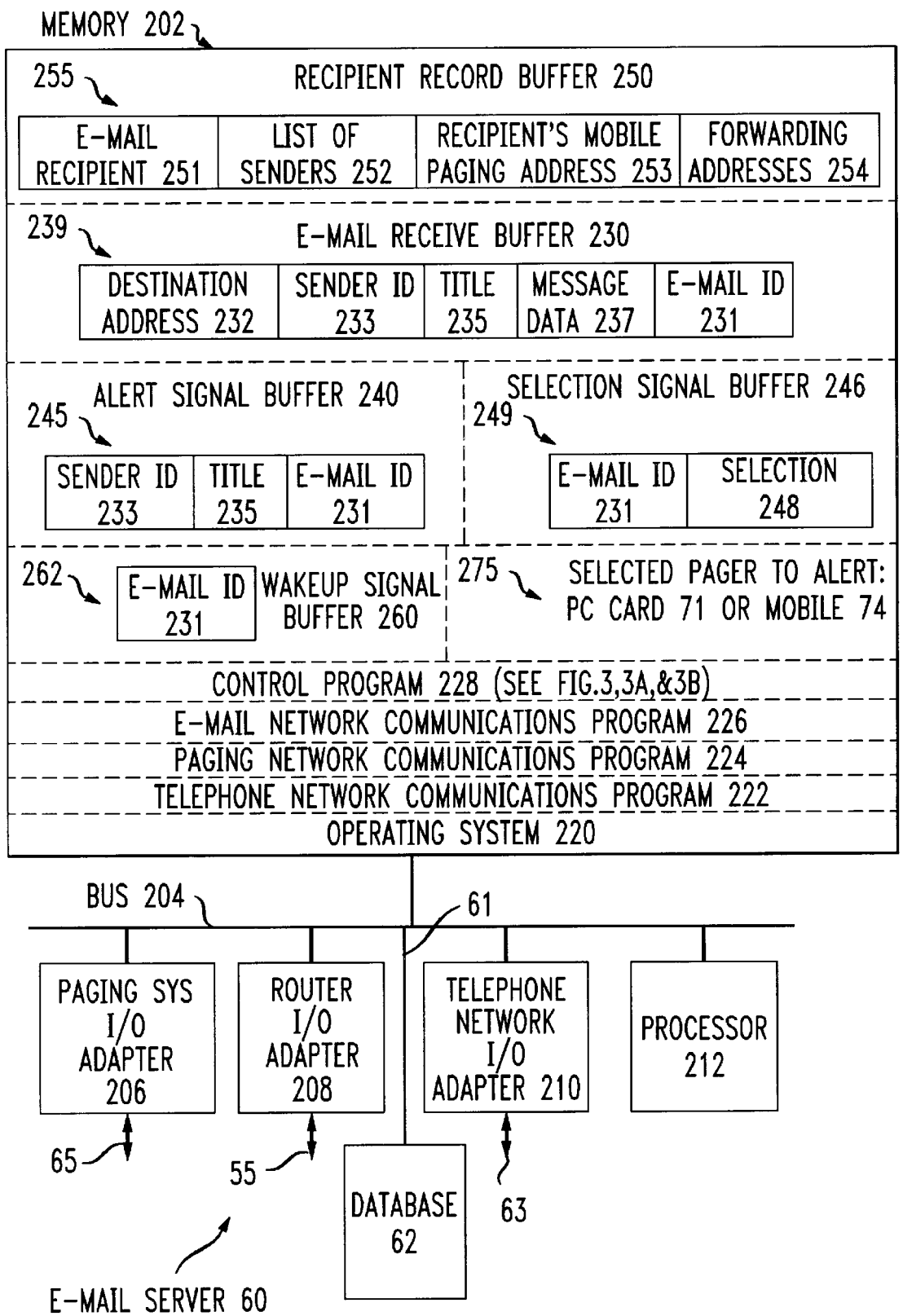
FIG. 2 shows the E-Mail server 60 in greater detail.

The E-Mail server 60 is shown in greater detail in FIG. 2. Memory 202 is connected by the bus 204 to the paging system I/O adapter 206, to the router I/O adapter 208, to the telephone network I/O adapter 210, to the processor 212, and to the database 62 over line 61. The memory 202 includes an operating system program 220, a telephone network communications program 222, a paging network communications program 224, an E-Mail network communications program 226, and the control program 228 shown in FIGS. 3, 3A, and 3B. The programs are composed of executable instructions which, when executed by the processor 212, carry out the functions performed by the E-Mail server 60. Memory 202 also includes a recipient record buffer 250 which stores the recipient record 255 accessed from the database 62. The record 255 is shown with the fields for E-Mail recipient 251, list of senders 252, recipient's mobile paging address 253, and forwarding addresses 254. Memory 202 also includes an E-Mail receive buffer 230 which stores an E-Mail message 239 received from the E-Mail network 40. The message is shown with the fields for destination address 232, sender ID 233, title 235, message data 237, and E-Mail ID 231. Memory 202 also includes an alert signal buffer 240 with the alert signal 245 having fields 233, 235, and 231. Memory 202 also includes a selection signal buffer 246 with a selection signal 249 having fields 231 and 248. Memory 202 also includes a wakeup signal buffer 260 with wakeup signal 262 having the field 231. Memory 202 also includes a buffer 264 to store the alert mode stored in the recipient's record 255 for selecting either the PC pager card 71 to alert or selecting the mobile pager 74 to alert.

Figure 1A:
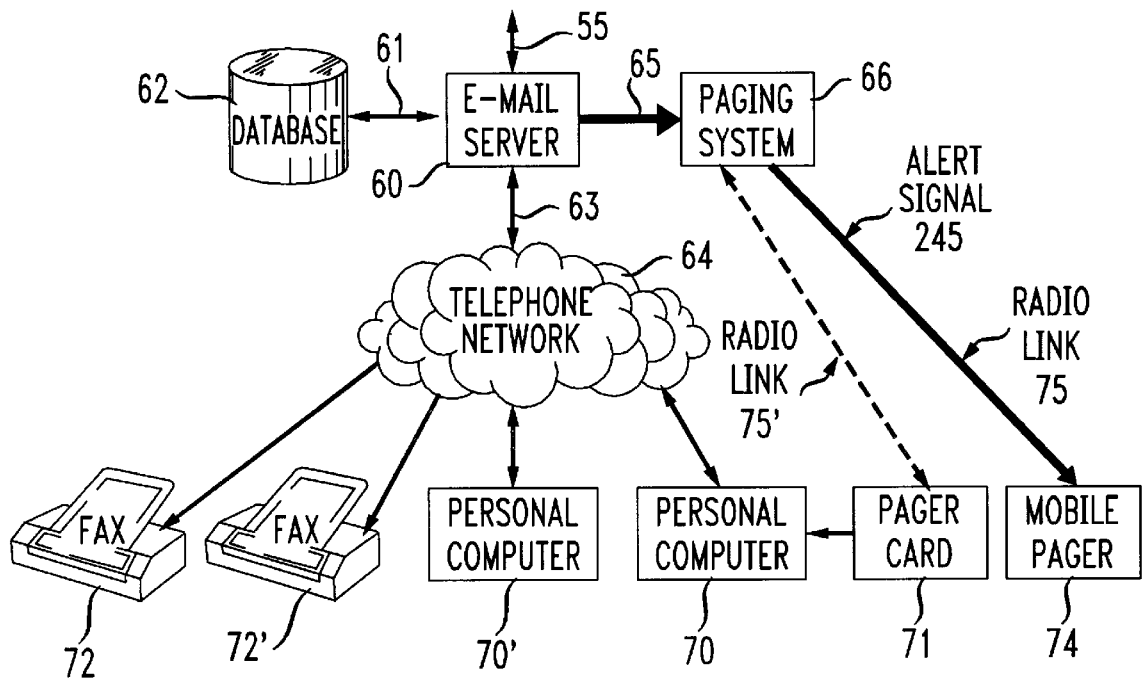
FIG. 1A is a dataflow diagram showing the server 60 sending an alert signal 245 over the paging network 42 in the mobile alert mode.
Figure 1B:
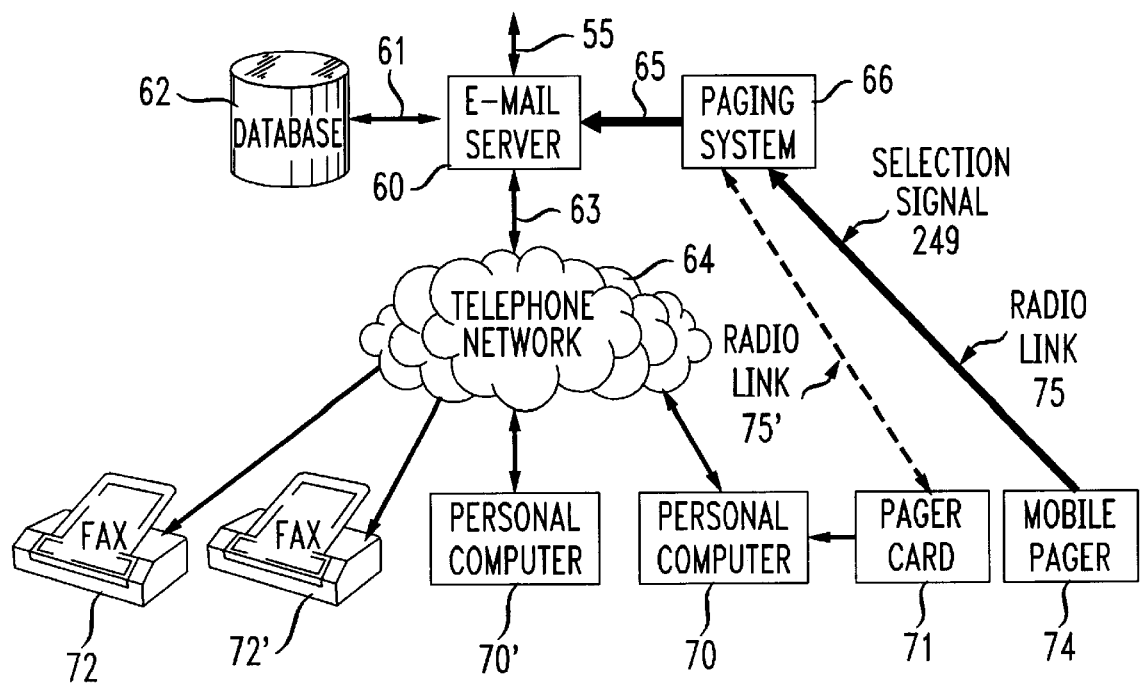
FIG. 1B is a dataflow diagram showing the mobile pager 74 sending a selection signal 249 to the server 60 in the mobile alert mode.
Figure 3:
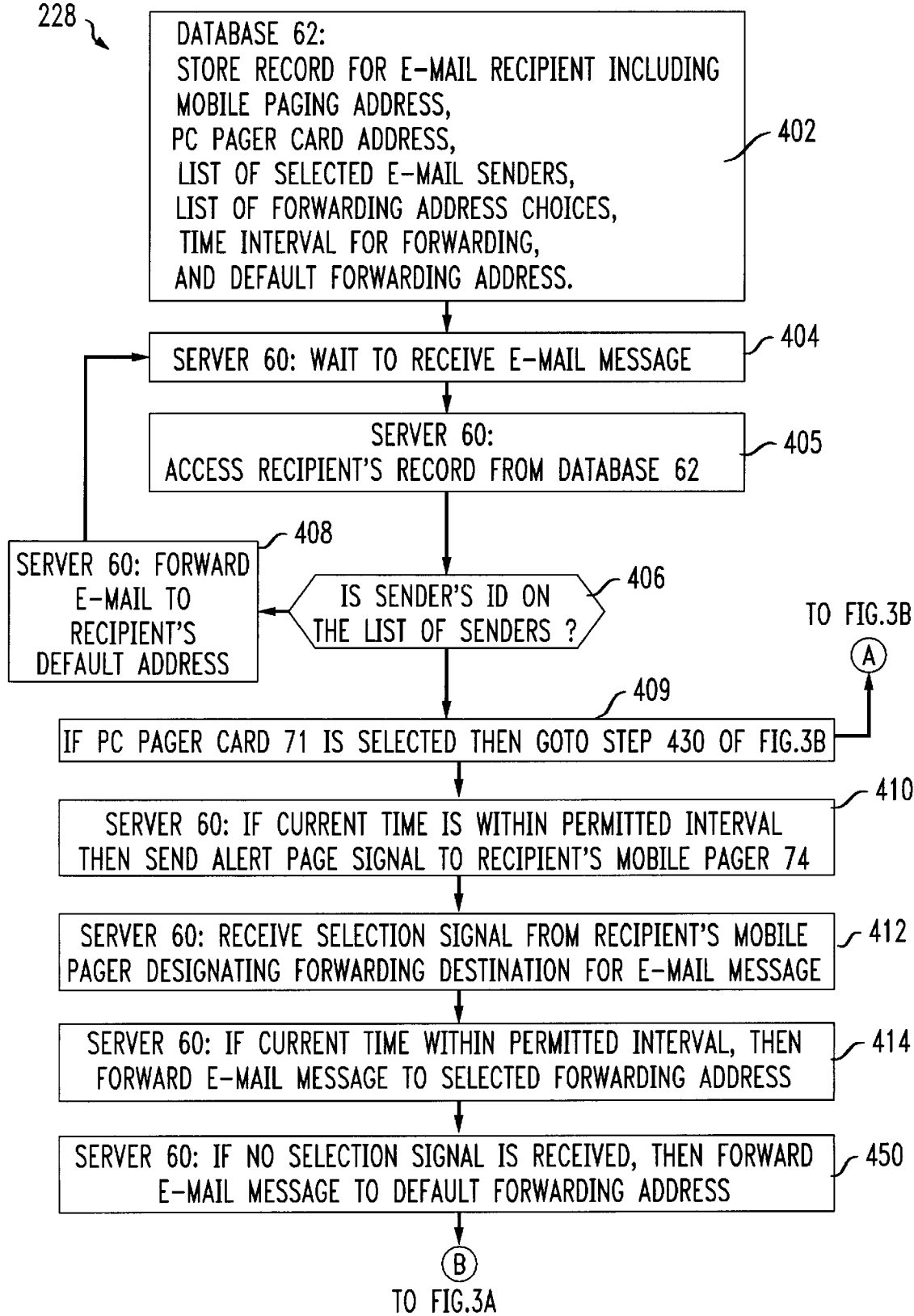
Figure 5:
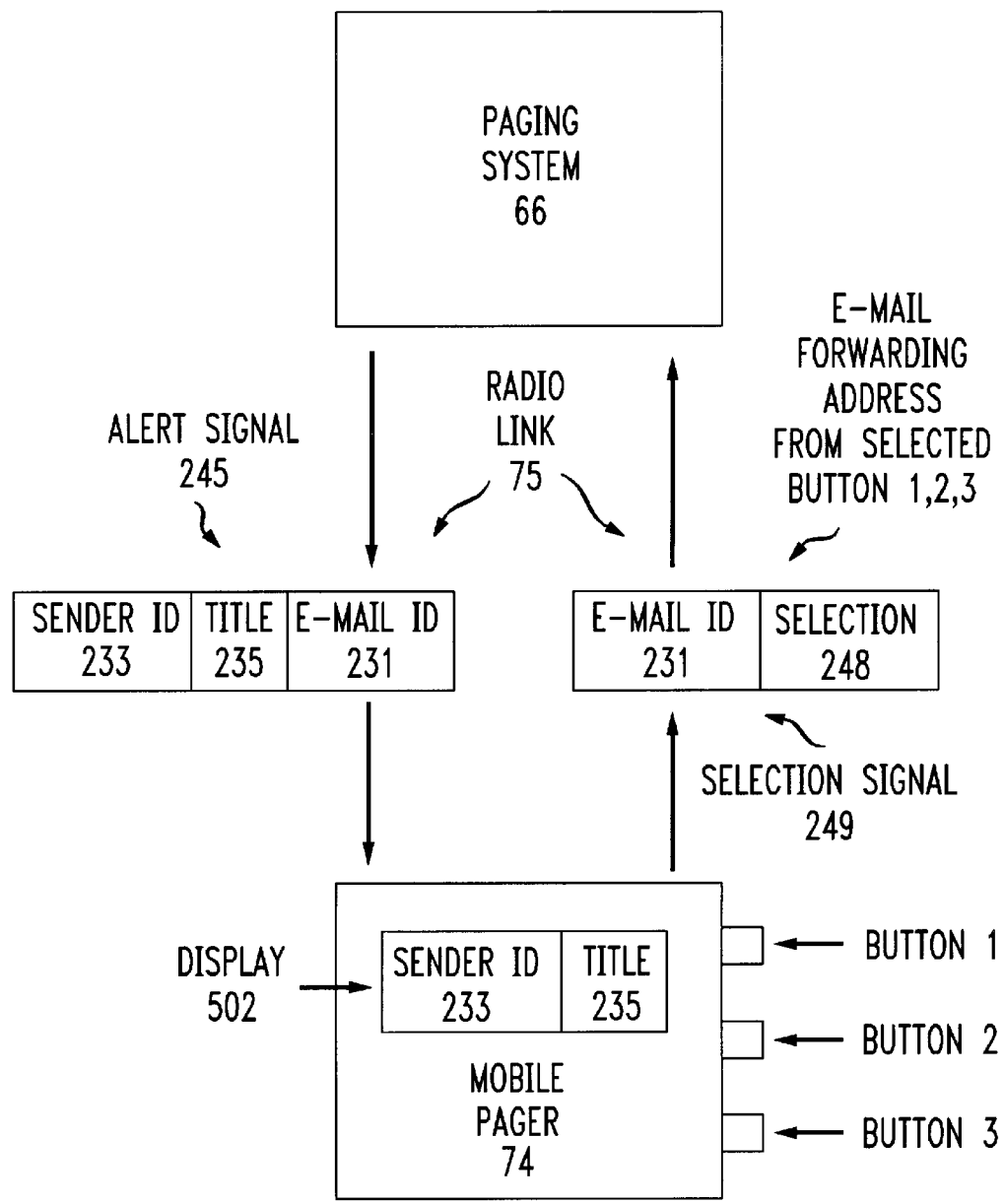
FIG. 5 shows an example of the alert signal 245 and the selection signal 249.

In accordance with the invention, the E-Mail server 60 is controlled by the control program 228 shown in FIGS. 3, 3A, and 3B. The server 60 sends a summary of the E-Mail message to the recipient over a different network, such as the wireless paging network 42, than the E-Mail network 40. FIG. 1A is a dataflow diagram showing the server 60 sending over line 65 an alert signal 245 to the paging network 42 for transmission by the paging system 66 over the radio link 75 to the mobile pager transceiver 74. FIG. 5 shows an example of the alert signal 245 which includes the sender ID 233 "S. Smith", the title 235 of the E-Mail message "Meeting Notice", and the E-Mail message ID 231 "ssmith-76-0930-091296". The recipient can view the summary of the E-Mail message on the display 502 of the mobile pager 74 and can select a forwarding destination for the E-Mail message using the buttons 1, 2, or 3. FIG. 1B is a dataflow diagram showing the mobile pager 74 sending a selection signal 249 over the radio link 75 to the paging system 66 of the paging network 42. The selection signal 249 includes the selection value 248 which is transferred over line 65 to the E-Mail server 60. The E-mail server 60 then forwards the E-Mail message to the selected destination. The E-Mail message can be forwarded by the server 60 over another network, such as the public telephone network 64, to a selected computer 70 or 70' or to a selected FAX machine 72 or 72' at the recipient's office, home, or other destination. The E-Mail message can also be forwarded over the alert network to the recipient.

The E-Mail server 60 of FIG. 2 includes a database 62 of recipient records 255 for all of the E-Mail recipients it services. FIG. 4 shows a first recipient record 255 for Recipient_A and a second recipient record 255' for Recipient_B. Each recipient establishes a list of senders 252 whose messages are considered important to the recipient, the list being included in the recipient's record 255. Step 402 of the control program 228 of FIG. 3 stores the recipient record 255. The server 60 waits to receive an E-Mail message for any of the recipients it services in Step 404. When the E-Mail server 60 receives an E-Mail message 239 it loads it into buffer 230 and then accesses the recipient's record 255 from the database 62 in step 405. The record 255 is loaded into buffer 250. The mobile alert mode from the record 255 is set in buffer 264. Step 406 determines if the sender ID 233 in the received message 239 matches any of the senders in the sender list 252 of the recipient's record. If there is no match, then step 408 has the server 60 forward the E-Mail message 239 to the general default address provided in the recipient's record shown in FIG. 4. If step 406 determines that there is a match, then the server 60 alerts the recipient to the arrival of such important messages to enable the recipient to designate to the server 60 a selected forwarding destination to send the message. The alert signal 245 includes enough information about the message, for example the name of the sender 233 and the title or a summary of the message 235, to enable a forwarding selection to be made.

In one embodiment of the invention, the recipient sets the alert mode field of his recipient record 255 in FIG. 4 to the mobile alert state. For example, on Thursday afternoon, Recipient_A plans to play golf the next day. He uses his personal computer 70 at his office to send a mode setting command over the telephone network 64 to the server 60, to set the alarm mode to "mobile alarm" in his record 255 in the database 62. Then on Friday, Recipient_A carries his mobile pager 74 while he is away from the office. At 9:30 AM, his boss, S. Smith, sends an E-Mail message 239 to him entitled "Meeting Notice". The server 60 receives the message, accesses Recipient_A's record 255 from database 62, and loads it into buffer 255. Step 406 determines that the sender "S. Smith" is included in the list of senders 252, and the program passes to Step 409. The mobile alert mode in buffer 264 causes the program to pass to step 410. The record 255 of FIG. 4 includes a "Time OK" field for each sender indicating the interval in the day during which Recipient_A is willing to receive alert signals for that particular sender. Step 410 determines that the current time is within that permitted interval and proceeds to send the alert signal 245 to the recipient's mobile pager 74 using the mobile pager address 253 provided in the record 255. The dataflow diagram of FIG. 1A shows the action.

The wireless network 42 may alternately be a personal communications system (PCS) wireless network that communicates the alert signal to a personal communications device carried by the recipient. The mobile pager transceiver 74 or personal communications device has a display 502 shown in FIG. 5, upon which the recipient can view the sender's name and the title of the message or a summary of the message. Recipient_A sees that it is his boss, S. Smith, who has sent him an E-Mail message with the title "Meeting Notice". The recipient can use buttons or keys 1, 2, or 3 on the mobile pager 74 or personal communications device to select where the server should forward the E-Mail message. The record 255 in FIG. 4 shows three choices for forwarding addresses corresponding to the recipient pressing either button 1, or button 2, or button 3. The values in the record 255 are the forwarding addresses corresponding to the three choices. The mobile pager 74 or personal communications device then sends the selection signal 249 with the recipient's choice selection 248 over the wireless network 42 to the server 60 to forward the message to one of several destinations. Step 412 of FIG. 3 receives the selection signal 249 at the server 60. Step 414 can optionally determine if the current time is within the permitted interval and optionally forward the E-Mail message to the default address if outside the permitted interval. However, if the current time is within the permitted time interval, Step 414 has the server 60 forward the E-Mail message to a forwarding address 254 specified in the recipient's record 255 of FIG. 4, corresponding the recipient's choice selection 248.

Figure 1C:
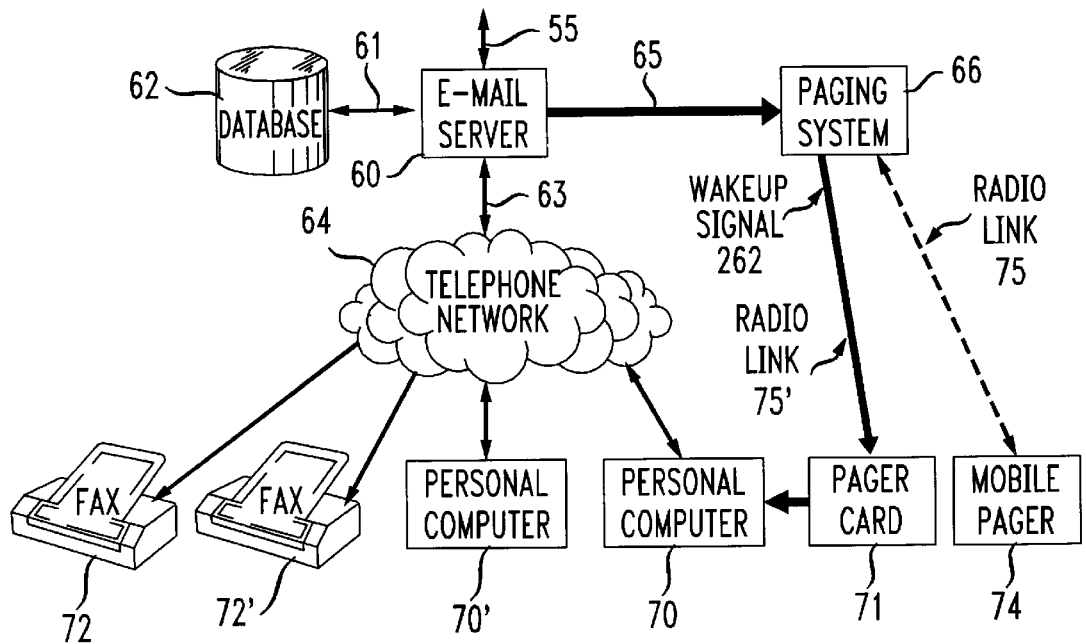
FIG. 1C is a dataflow diagram showing the wakeup signal 262 sent from the server 60 to the PC pager card 71 in the mobile alert mode.
Figure 1D:
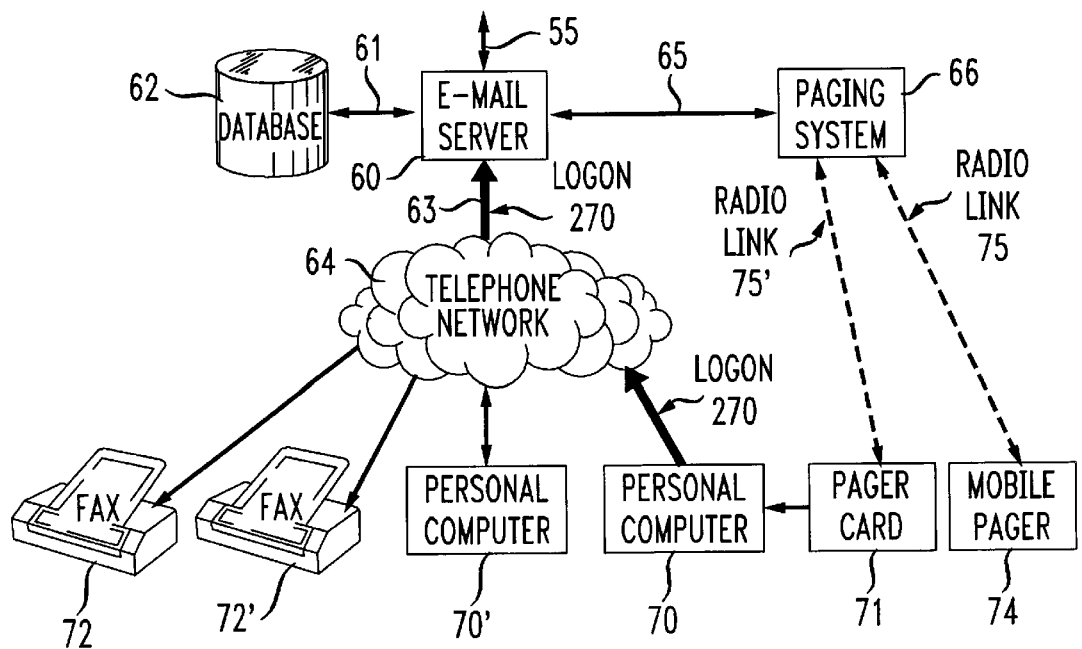
FIG. 1D is a dataflow diagram showing the logon signal 270 from the personal computer 70 to the E-Mail server 60 in response to the wakeup signal 262 in the mobile alert mode.
Figure 1E:
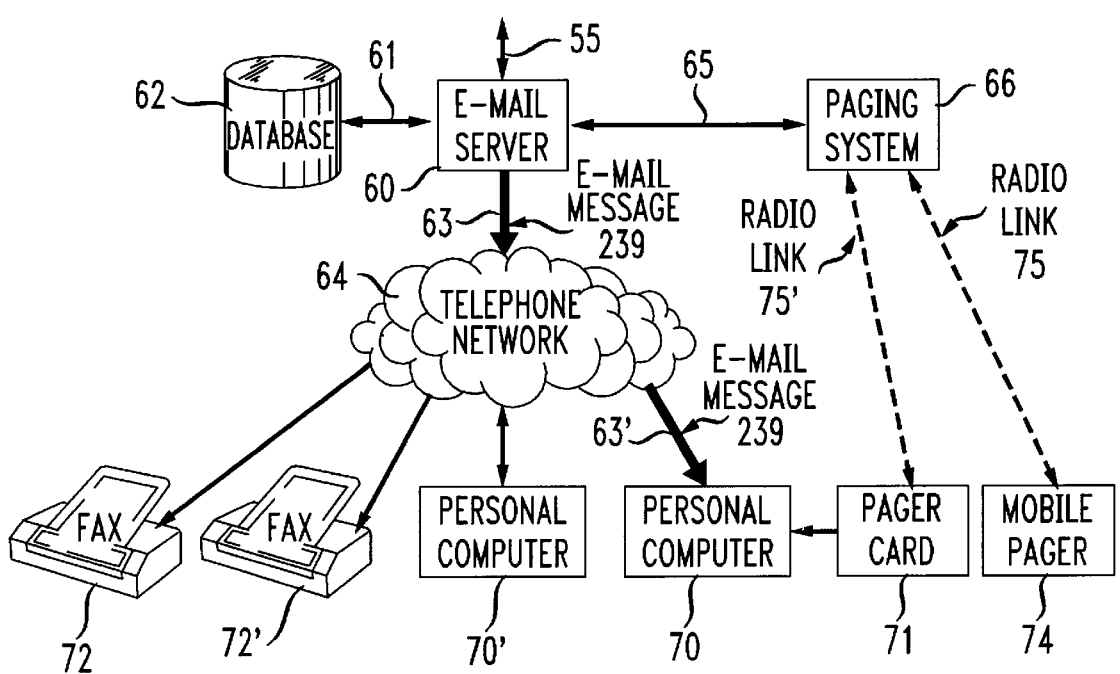
FIG. 1E is a dataflow diagram showing the downloading of the E-Mail message from the server 60 to the personal computer 70.

If the forwarding address is to the recipient's computer 70, then FIG. 3A provides additional steps to be taken by the server 60 to wakeup the computer 70 and have it logon to the E-Mail server 60. Step 420 determines if the computer 70 is logged on to the server 60, and if it is, the server sends the E-Mail message 239 over the telephone network 64 to the computer 70. Step 422 determines if the computer 70 is not logged on to the server, then a wakeup signal 262 is sent by the server 60 over line 65 to the paging system 66 of the paging network 42 and over the radio link 75' to the wireless pager transceiver card 71 connected to the computer 70. The wakeup signal 262 includes the E-Mail ID 231 which sufficiently identifies the E-Mail message 239 waiting on the server, to enable the computer 70 to logon and request the message. The computer 70 can have its storage partitioned into several mutually exclusive areas, one for each of several recipients. The wake up signal 262 can include the identity of a particular recipient and the E-Mail message will be directed to the corresponding storage area in computer 70. FIG. 1C is a dataflow diagram showing the wakeup signal 262 sent from the server 60 to the PC pager card 71. Step 424 waits for the logon from the personal computer 70. FIG. 1D is a dataflow diagram showing the logon signal 270 from the personal computer 70 over line 63' and the telephone network 64 and the line 63 to the E-Mail server 60 in response to the wakeup signal 262. Step 426 of FIG. 3A receives the logon signal from computer 70 and downloads the E-Mail message 239 from the server 60, over the line 63, the telephone network 64, and the line 63' to the personal computer 70. FIG. 1E is a dataflow diagram showing the downloading of the E-Mail message from the server 60 to the personal computer 70. In an alternate embodiment, the E-Mail message can be sent by the Server 60 over the paging network 42 to the mobile pager 74.

In the alternative, Step 450 determines that if there has been no selection signal 249 received by the server 60, then the server forwards the E-Mail message to the specific default address specified in the recipient's record 255 for this particular sender.

Figure 1F:
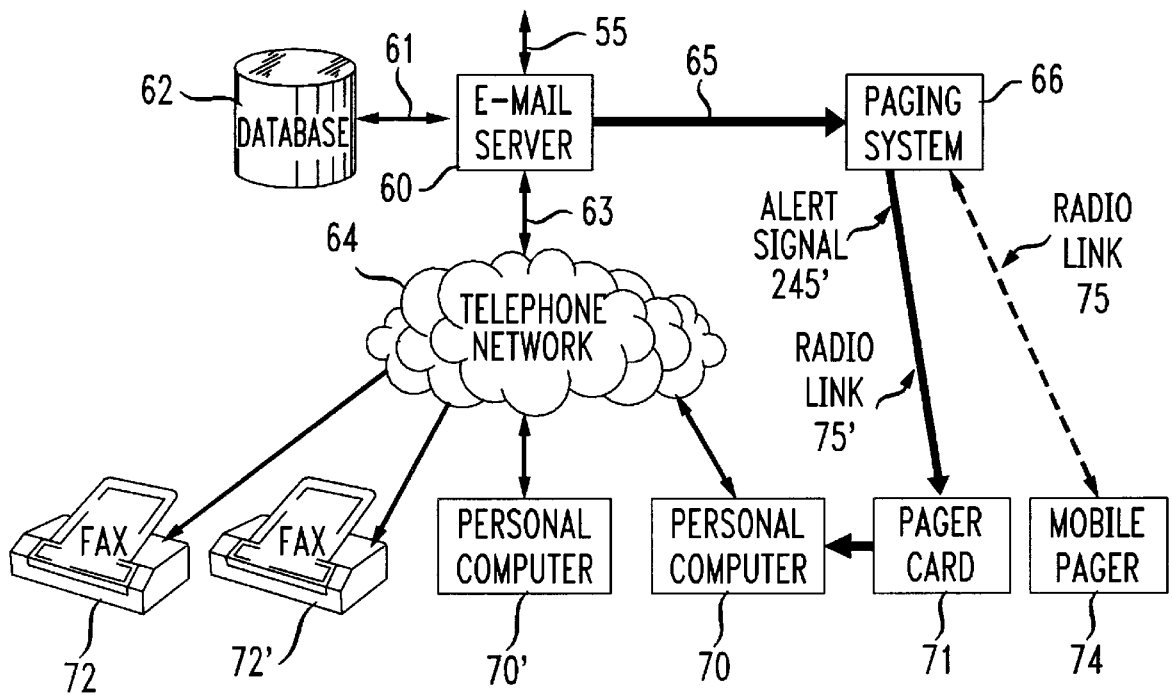
FIG. 1F is a dataflow diagram showing the server 60 sending the alert signal 245' to the pager card 71 in the PC pager card alert mode.
Figure 1G:
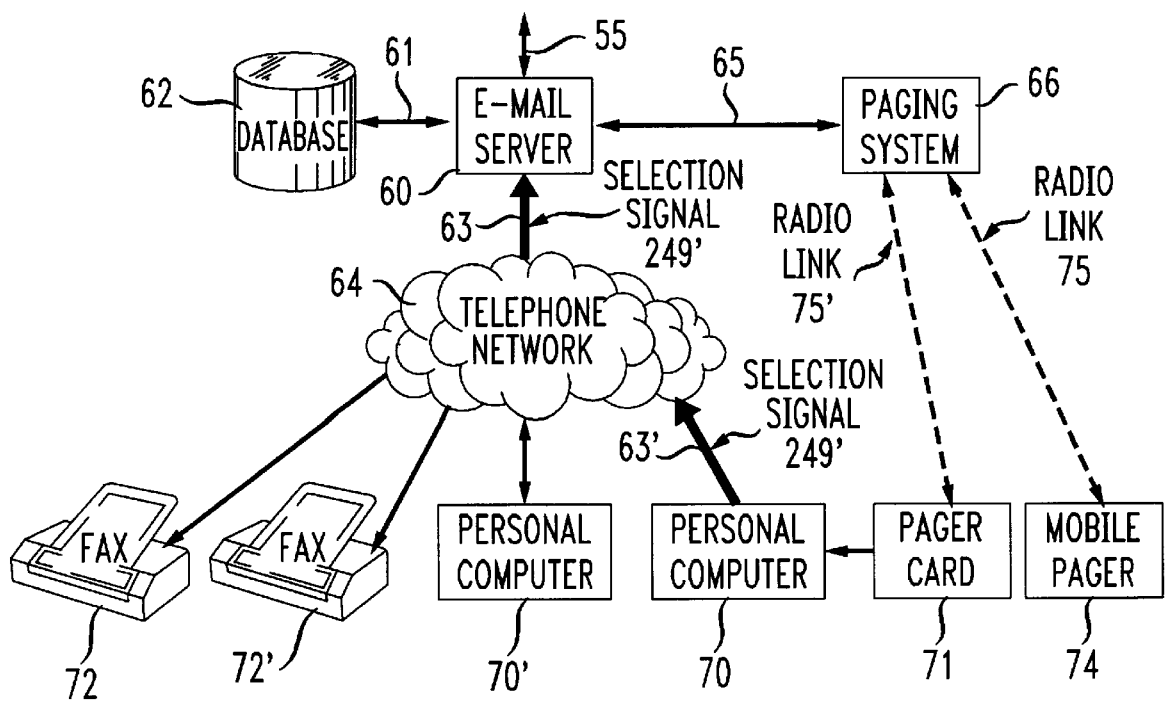
FIG. 1G is a dataflow diagram showing the selection signal 249' sent from the recipient's computer 70 over the public telephone network 64 to the server 60 in the PC pager card alert mode.

In another embodiment, referred to here as the PC pager card alarm mode, the server 60 transmits an alert signal 245' over the wireless paging network 42 directly to the pager card 71 attached to the recipient's personal computer 70. Continuing with the example of the Recipient_A, it begins to rain on his golf game and Recipient_A decides to return to the office. He uses his personal computer 70 at his office to send a mode setting command over the telephone network 64 to the server 60, to set the alarm mode to "PC pager card alarm" in his record 255 in the database 62. When another E-Mail message to Recipient_A arrives at the server 60 from sender J. Jones, step 409 of FIG. 3 determines that the buffer 264 now is set to the "PC pager card alarm" mode and causes the program to pass to step 430 of FIG. 3B. Step 430 determines that the current time is within the permitted interval and proceeds to send the alert signal 245' to the recipient's PC pager card 71 connected to his personal computer 70 using the PC pager card address provided in the record 255. The dataflow diagram of FIG. 1F shows the server 60 sending the alert signal 245' over radio link 75' to the pager card 71, in the PC pager card alert mode. Step 432 of FIG. 3B waits for the logon and the recipient's selection from the personal computer. The recipient can view the sender's name and the title of the message or a summary of the message which is displayed on the computer 70 and can send a selection signal 249' to the server 60 to forward the message to one of several destinations. FIG. 1G is a dataflow diagram showing the selection signal 249' sent from the recipient's computer 70 over line 63', over the public telephone network 64, and over line 63 to the server 60. Step 434 can optionally determine if the current time is within the permitted interval and optionally forward the E-Mail message to the default address if outside the permitted interval. However, if the current time is within the permitted time interval, Step 434 has the server 60 forward the E-Mail message to a forwarding address 254 specified in the recipient's record 255 of FIG. 4, corresponding the recipient's choice. The E-Mail message can be forwarded over the public telephone network, or over the E-Mail network, or over another network such as the wireless paging network to the selected destination. In the alternative, Step 450 of FIG. 3B determines that if there has been no selection signal 249' received by the server 60, then the server forwards the E-Mail message to the specific default address specified in the recipient's record 255 for this particular sender.

Another feature of the invention shown in FIG. 4 is the inclusion in the recipient's record 255 of a plurality of alternate forwarding addresses 254 previously specified by the recipient for each sender 252. The recipient can choose the desired forwarding address 254 with the selection signal 249 he sends to the server 60. The record 255 at the server can also include a predefined time interval 257 permitted for sending the alarm signal to the pager 71 or 74. The record 255 at the server can also include a default forwarding address 259 in case the recipient does not respond with a selection signal within a default time-out interval. Customized values for the predefined time interval 257 and a default forwarding address 259 can be specified for each sender 252 in the record 255.

Figure 6:
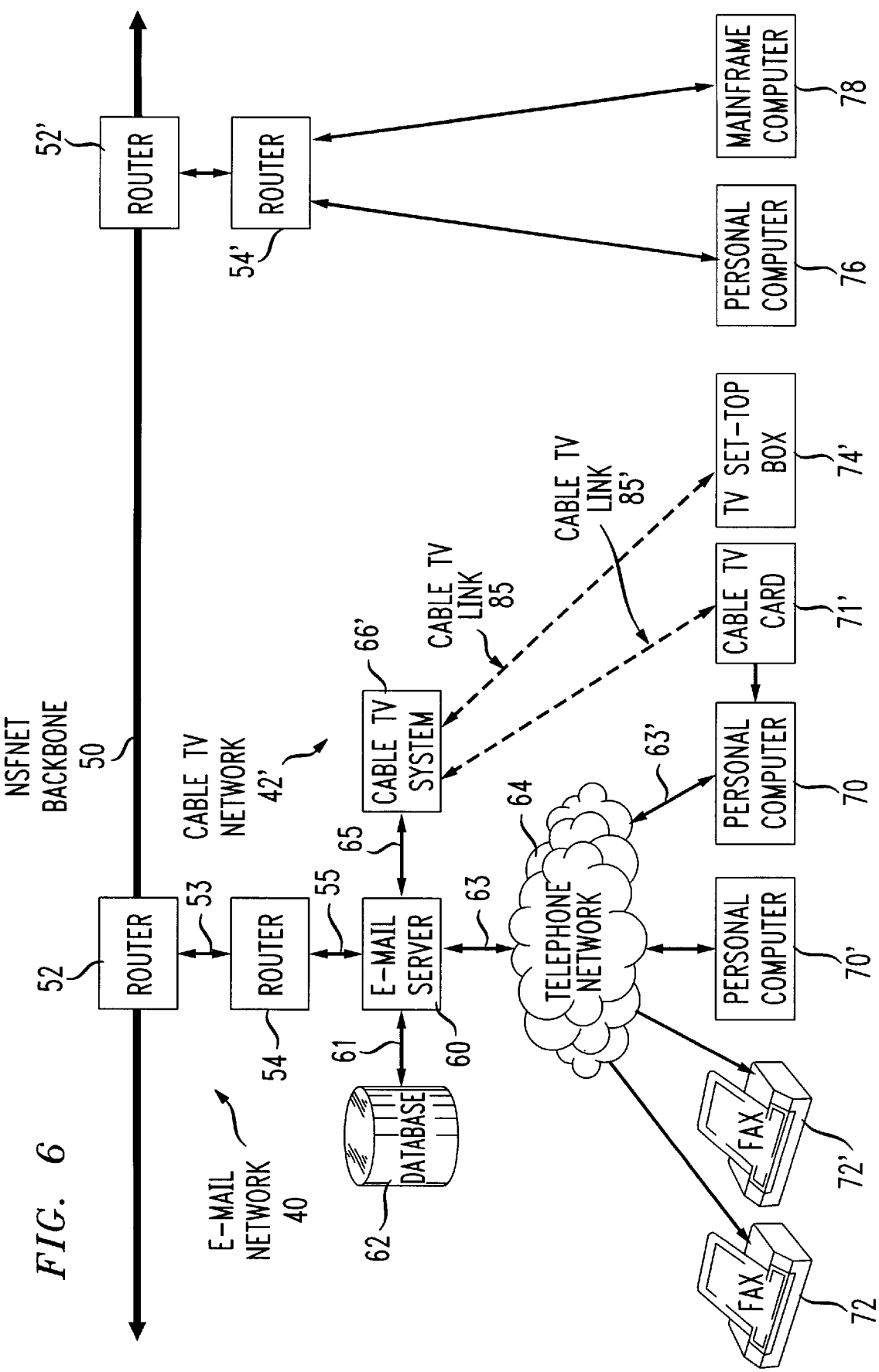
FIG. 6 shows another embodiment of the invention wherein the server 60 transmits the alert signal over a cable television network 42'.

FIG. 6 shows another embodiment of the invention with an alternate network 42', wherein the server 60 transmits the alert signal over line 65 to a cable TV system 66' of a cable television network 42' and over a cable TV link 85 to a TV set-top box transceiver 74' near the recipient. A conventional television connected to the set-top box 74' displays the sender's name and the title of the E-Mail message or a summary of the E-Mail message. The recipient can use buttons or keys on the set-top box 74' to make a selection. The set-top box 74' then sends the selection signal over the cable TV link 85 of the cable television network 42' to the E-Mail server 60 to forward the E-Mail message to one of several destinations. If the forwarding address is to the recipient's computer 70, an additional step is taken by the server 60 to wakeup the computer 70 and have it log on to the E-Mail server 60. In response to the selection signal, the server 60 sends a wakeup signal over cable TV link 85' to a cable television adapter card 719 attached to the recipient's computer 70. The wakeup signal sufficiently identifies the E-Mail message waiting on the server 60, to enable the computer 70 to logon and request the message.

Although a specific embodiment of the invention has been disclosed, it will be understood by those having skill in the art the changes can be made to the specific embodiment without departing from the spirit and the scope of the invention.

What is claimed is:

1. In a communications system including an E-Mail server coupled to an E-Mail network, the server having a database storing a plurality of records, each record being for an E-Mail recipient and including an alert signal address in an alert network in a radio communications medium, coupled to the E-Mail server, a method comprising the steps of:

a) storing in a recipient's record in the database identities of selected E-Mail senders and a forwarding destination for E-Mail sent to the recipient;

b) receiving at the E-Mail server an E-Mail message including the recipient's identity and a received identity of a sender;

c) accessing the recipient's record in response to receiving the E-Mail message;

d) comparing the received identity of the sender with the selected sender identities in the recipient's record;

e) sending an alert signal to the E-Mail recipient over the alert network if the received identity of the sender matches one of the selected sender identities;

f) receiving a response signal in the radio communications medium from the E-Mail recipient in response to the alert signal; and g) forwarding the E-Mail message to the forwarding destination in response to the response signal.

2. The method according to claim 1, further comprising the steps of:

f) storing in the recipient's record a forwarding destination for E-Mail sent to the recipient;

g) receiving a response signal from the E-Mail recipient in response to the alert signal; and h) forwarding the E-Mail message to the forwarding destination in response to the response signal.

3. The method according to claim 2, wherein said step h) comprises the substep of:

i) forwarding the E-Mail message over a telephone network coupled to the E-Mail server.

4. The method according to claim 2, further comprising the step of:

i) waiting for a predetermined time-out interval, and then, if no response signal to the alert signal is received, forwarding the E-Mail message to a default forwarding destination.

5. The method according to claim 2, wherein said step h) comprises the substep of:

i) forwarding the E-Mail message to the recipient's computer over a telephone network coupled to the E-Mail server.

6. The method of claim 5 wherein the computer is partitioned into plural mutually exclusive areas and the E-Mail message is stored in one of those areas for the recipient.

7. The method of claim 2, wherein said step h) comprises the substeps of:

i) forwarding the E-Mail Messages over the alert network to the recipient.

8. The method according to claim 1, wherein step e) comprises the substep of:

f) sending the alert signal over a wireless network.

9. The method according to claim 1, further comprising the steps of:

f) storing in the recipient's record a selected forwarding destination for E-Mail received from a selected sender;

g) receiving a response signal from the E-Mail recipient including a designation of the selected forwarding destination, in response to the alert signal; and h) forwarding the E-Mail message to the selected forwarding destination as designated by the response signal.

10. The method according to claim 1, further comprising the step of:

f) forwarding the E-Mail message to a default forwarding destination if the received identity of the sender does not match one of the selected sender identities.

11. The method according to claim 1, wherein step a) comprises the substep of:

f) string in the recipient's record a selected time interval during which forwarding of an E-Mail message is allowed;

wherein step b) comprises the substep of:

g) receiving the E-Mail message at a given instant; and wherein step e) comprises the substep of:

h) sending the alert signal if the given instant is within the selected time interval.

12. The method according to claim 11, further comprising the step of:

i) waiting for a predetermined time-out interval, and then, if no response signal to the alert signal is received, forwarding the E-Mail message to a default forwarding destination.

13. The method according to claim 1, further comprising the steps of:

f) storing in the recipient's record a forwarding destination for E-Mail sent to the recipient;

g) receiving a response signal from the E-Mail recipient in response to the alert signal;

h) sending a wakeup signal to the forwarding destination in response to the response signal; and i) forwarding the E-Mail message to the forwarding destination.

14. A communications system, comprising:

an E-Mail server having a database storing a plurality of records, the database including a recipient's record containing identities of selected E-Mail senders and a forwarding destination for E-Mail sent to the recipient;

a first interface in said E-Mail server coupled to an E-Mail network, receiving an E-Mail message including the recipient's identity and a received identity of a sender;

a processor in said E-Mail server accessing the recipient's record in response to receiving the message;

said processor comparing the received identity of the sender with the selected sender identities in the recipient's record;

a second interface in said E-Mail server coupled to an alert network in a radio communications medium, sending an alert signal to the recipient over the alert network if the processor matches the received identity with one of the selected sender identities;

means for receiving a response signal in the radio communications medium from the E-Mail recipient in response to the alert signal; and means for forwarding the E-Mail message to the forwarding destination in response to the response signal.

15. The system according to claim 14, wherein said alert network is a wireless network.

16. The system according to claim 14, wherein said alert network is a cable television network.

17. The system according to claim 14, further comprising:

said database storing in the recipient's record a forwarding destination for E-Mail sent to the recipient;

said second interface receiving a response signal from the E-Mail recipient in response to the alert signal; and a third interface in said E-Mail server coupled to a forwarding network, forwarding the E-Mail message to the forwarding destination over the forwarding network in response to the response signal.

18. The system according to claim 14, wherein said alert network is a wireless network, and the system further comprises:

said database storing in the recipient's record a forwarding destination for E-Mail sent to the recipient;

a wireless transceiver in said alert network, receiving the alert signal and transmitting a response signal to the E-Mail server; and a third interface in said E-Mail server coupled to a forwarding network, forwarding the E-Mail message to the forwarding destination over the forwarding network in response to the response signal.

19. The system according to claim 18, wherein said wireless transceiver is a wireless mobile pager.

20. The system according to claim 18, wherein said wireless transceiver is a wireless pager card coupled to a computer.

21. The system according to claim 17, further comprising:
said forwarding destination being a computer.

22. The system according to claim 17, further comprising:
said forwarding destination being a fax machine.

23. The system according to claim 14, further comprising:

said database storing in the recipient's record a plurality of forwarding destinations for E-Mail sent to the recipient;

said second interface receiving a response signal from the E-Mail recipient in response to the alert signal;

said response signal including a selection signal to select one of the plurality of forwarding destinations; and said E-Mail server forwarding the E-Mail message to said one of the plurality of forwarding destinations in response to the selection signal.

24. The system according to claim 17, wherein said forwarding network further comprises:

a telephone network coupled to said E-Mail server, said E-Mail server forwarding the E-Mail message to said forwarding destination over said telephone network in response to said response signal.

25. The system according to claim 24, further comprising:
said forwarding destination being a personal computer.

26. The system according to claim 24, further comprising:
said forwarding destination being a fax machine.

27. The system according to claim 14, wherein said alert network is a wireless network, and the system further comprises:

said database storing in the recipient's record a forwarding destination for E-Mail sent to the recipient;

a wireless transceiver in said alert network, receiving the alert signal;

a processor coupled to the wireless transceiver, automatically providing selection values in response to the alert signal;

said wireless transceiver transmitting a response signal to the E-Mail server in response to the selection values; and a third interface in said E-Mail server coupled to a forwarding network, forwarding the E-Mail message to the forwarding destination over the forwarding network in response to the response signal.

28. The system according to claim 27, wherein said wireless transceiver is a wireless mobile pager.

29. The system according to claim 27, wherein said wireless transceiver is a wireless pager card coupled to a computer.

30. The system according to claim 27, wherein said forwarding network further comprises:

a telephone network coupled to said E-Mail server, said E-Mail server forwarding the E-Mail message to said forwarding destination over said telephone network in response to said response signal.

31. The system according to claim 30, further comprising: said forwarding destination being a personal computer.

32. The system according to claim 30, further comprising: said forwarding destination being a fax machine.

33. An article of manufacture for use in a computer system, comprising:

a computer useable medium having computer readable program code means embodied therein for controlling an E-Mail server coupled to an E-Mail network, the server having a database storing a plurality of records, each record being for an E-Mail recipient and including an alert signal address in an alert network in a radio communications medium, coupled to the E-Mail server, the computer readable program means in said article of manufacture comprising:

a computer readable program code means for causing a computer to store in a recipients record in the database identities of selected E-Mail senders and a forwarding destination for E-Mail sent to the recipient;

a computer readable program code means for causing a computer to receive at the E-Mail server an E-Mail message including the recipient's identity and a received identity of a sender;

a computer readable program code means for causing a computer to access the recipient's record in response to receiving the E-Mail message;

a computer readable program code means for causing a computer to compare the received identity of the sender with the selected sender identities in the recipient's record;

a computer readable program code means for causing a computer to send an alert signal to the E-Mail recipient over the alert network if the received identity of the sender matches one of the selected sender identities;

a computer readable program code means for causing a computer to receive a response signal in the radio communications medium from the E-Mail recipient in response to the alert signal; and a computer readable program code means for causing a computer to forward the E-Mail message to the forwarding destination in response to the response signal.

\* \* \* \* \*